Aug. 1, 1933.  F. L. PRESCOTT  1,920,434
SYSTEM OF MANUFACTURE OF SOLIDIFIED CARBON DIOXIDE GAS
Filed Nov. 4, 1929
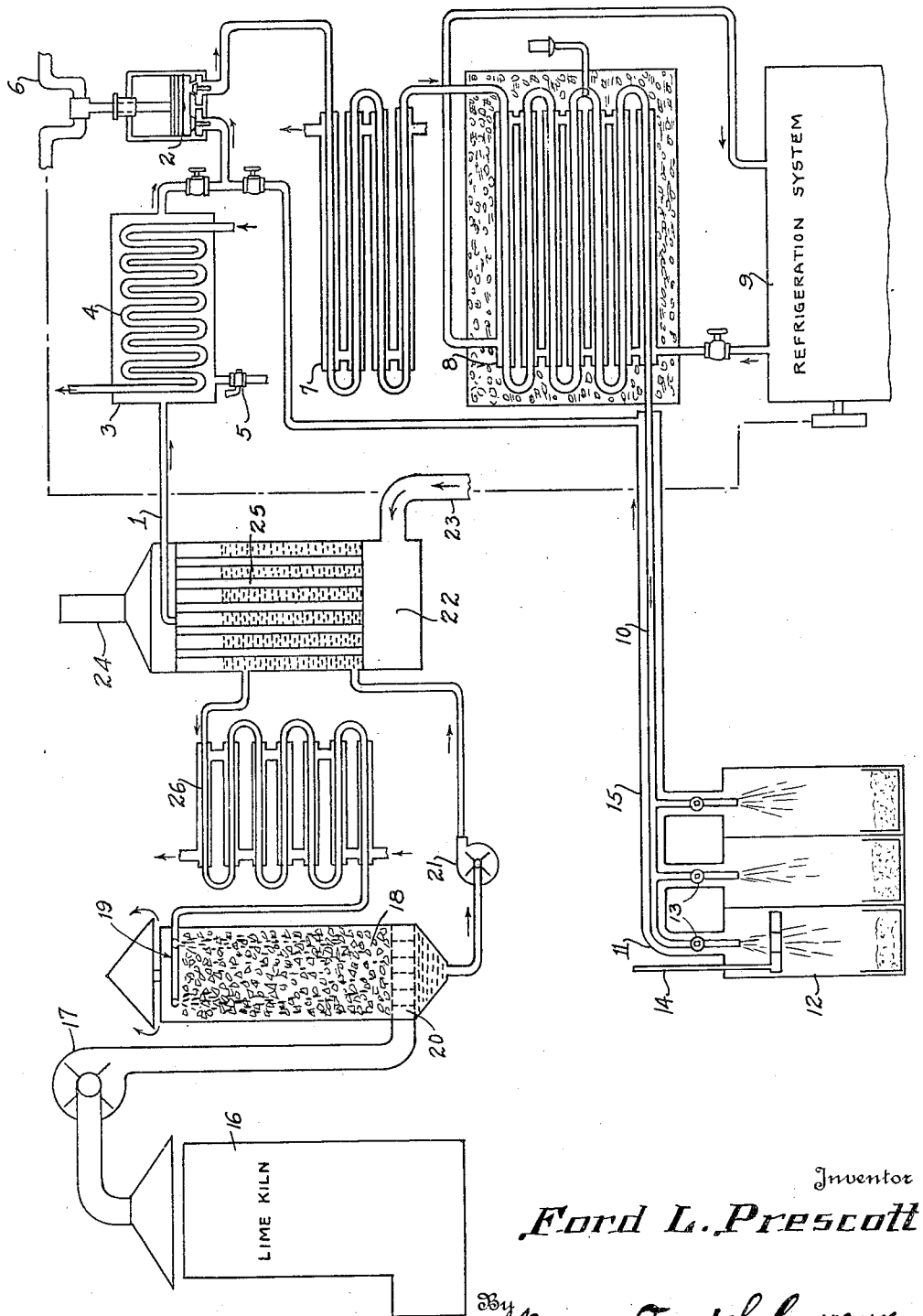
Inventor
*Ford L. Prescott*
By *Mason Fenwick Lawrence*
Attorneys Patented Aug. 1, 1933

1,920,434

UNITED STATES PATENT OFFICE 1,920,434

SYSTEM OF MANUFACTURE OF SOLIDIFIED CARBON DIOXIDE GAS

Ford L. Prescott, Dayton, Ohio, assignor of one-third to Dann C. Squires and one-third to J. F. Diehl, Coral Gables, Fla.

Application November 4, 1929
Serial No. 404,842

1 Claim. (Cl. 62—121)

This invention relates to the manufacture of solidified carbon dioxide gas, and it has for its principal object to materially lower the pressure necessary for the production of the solidified product, this being accomplished by refrigerating the compressed gas through the agency of a refrigerating system, preferably operating upon the Carnot principle.

An object of the invention is to provide, in a system as above described, multi-stage cooling of the compressed gas, in the final stage of which cooling and condensation takes place.

A further object of the invention is the provision of means for collecting that portion of the carbon dioxide which does not solidify at the discharge point, and the return of the same to the compressor, this portion of the carbon dioxide being preferably carried in regenerative relation to the liquefied carbon dioxide gas just prior to its discharge, for further cooling of the same.

Another object of the invention is the provision of a plurality of snow receptacles, and valves in the discharge conduit for selectively discharging the carbon dioxide expansively into one or more of the receptacles, thus avoiding interruptions of the continuity of operation of the solidifying system.

Still another object of the invention relates to a complete system including, in combination, the means for making the carbon dioxide gas with the means for solidifying it.

Other objects of the invention will appear as the following description of an exemplary embodiment thereof proceeds.

In the drawing, the sole figure represents diagrammatically, a lay-out in which the principle features of the invention are illustrated in their cooperative relation.

Before describing this disclosure in detail, it is to be understood that in its broader adaptation, the invention is not to be construed as limited to any specific method or means for obtaining the carbon dioxide gas, and that the diagrammatic representation, therefore, illustrates only a specific form of the invention.

Referring now in detail to the several elements, the numeral 1 represents a conduit bringing carbon dioxide gas from a suitable source into the solidifying system. Said system includes a compressor 2, but prior to its being admitted to the compressor, the carbon dioxide gas is subjected to preliminary cooling in suitable apparatus, such as the tank 3 through which cold water circulates through the coil 4. One of the important effects of this preliminary cooling is that the moisture is condensed out, being precipitated to the bottom of the tank 3 from which it may be suitably drained, for instance, by the drain valve 5, the carbon dioxide gas being thus dried and entering the compressor in a dry state so that later on in the solidifying process, the working of the system will not be impeded by the presence in the pipes of frozen moisture.

The compressor may be of any desirable type, and run by any suitable source of power, the same being represented by the reference character 6.

From the compressor, the compressed carbon dioxide gas is conducted through a multistage cooling process, the first stage of which comprises the jacketed coils 7 through the jackets of which brine may circulate. When the carbon dioxide gas leaves the compressor, it has a pressure of, for example, 300 pounds per square inch, and a temperature of 250° F. When it leaves the first stage of cooling process, the pressure is approximately the same, but the temperature may have been reduced, say for instance, to 90° F. The compressed and somewhat cooled carbon dioxide then passes into the second stage cooler comprising, for example, a bank of jacketed coils 8, insulated by cork or other suitable material, the jackets of which form a part of the expansive phase of a refrigeration system 9 operating preferably according to the Carnot cycle, that is to say, a refrigerating system in which the low temperature is produced by the rapid expansion of a gas condensed by compression, or otherwise.

The refrigeration system may be of any suitable type and does not, in itself, constitute part of my invention, except insofar as it combines with the other units of the invention to produce a condensed carbon dioxide gas having low pressure and low temperature. From the second stage cooler or condenser, the carbon dioxide issues as a liquid having a temperature of minus 20° F. or lower, and a pressure not exceeding, for example, 300 pounds.

The issuing liquid carbon dioxide is conducted through a pipe 10, preferably communicating as by the branch pipe 11 with a plurality of snow receptacles 12. These receptacles are of sufficient capacity to permit rapid expansion of the carbon dioxide gas as it issues from the adjustable expansion valves 13. In the bottom of the receptacles suitable cartons are preferably placed, into which the carbon dioxide snow, eventuating from the rapid expansion of the gas, accumulates.

Among the minor details of the invention is the rammer 14, of which, but one is shown, although it is contemplated that there shall be one for each receptacle, and by which means snow is compacted in the cartons.

It is well known that not all of the issuing carbon dioxide is solidified by the adiabatic temperature drop, but some of it evaporates immediately into a gas, while at the same time, some of the carbon dioxide snow in the cartons also evaporates so that the atmosphere in the receptacles consists of substantially pure carbon dioxide. This is returned directly to the compressor by means of a conduit 15 having branches communicating to the several receptacles. The conduit 15 is preferably arranged around the conduit 10 in regenerative relation to the conduit 10 through which the liquefied carbon dioxide gas is passing, still further cooling the latter, although such cooling is to be regarded merely as an economic utilization of heat that would otherwise be wasted rather than as an essential step in the solidifying process.

From the above description, it will be understood that, ordinarily, in those instances in which carbon dioxide is compressed without being subsequently reduced to the low temperature attained by a refrigerating treatment such as that herein indicated, the carbon dioxide must be compressed to a pressure of about 1000 pounds to a square inch. The obtaining of this high pressure is attended with serious difficulties, such, for instance, as extreme heating of the carbon dioxide, the difficulty of keeping packings tight, bursting of pipes, and the additional load upon the engine.

In contrast to this, the compressor 2 has only to raise the pressure of the carbon dioxide gas approximately to 300 pounds per square inch, the multi-stage cooling and particularly the last stage of refrigeration being relied upon to reduce the moderately compressed gas to the point of liquefaction.

The provision of a plurality of snow receiving receptacles, any one or more of which may be selected for operation of the corresponding expansion valve, permits a continuous discharge of the carbon dioxide without any interruption in the function of the various phases of the system.

While, as has been stated, the invention contemplates the solidifying of carbon dioxide gas obtained from any source, the diagram illustrates, in connection with the solidifying system, a simple and efficient arrangement of apparatus by means of which substantially pure carbon dioxide may be obtained. A lime kiln or other source of impure carbon dioxide is indicated by the reference character 16, from which the carbon dioxide gas mixed with air or other impurity is then pumped by the blower 17 into an absorber 18. This consists of an up-right tank or cylinder containing a porous mass, such as coke over which sodium carbonate solution is permitted to trickle from the top downward, being admitted by the perforated coil 19 and collected at the bottom of the tank or cylinder in the lower chamber 20.

The carbon dioxide gas passes contrawise with respect to the descending shower of sodium carbonate, in the course of which it contacts with the sodium carbonate; the sodium carbonate solution absorbs the carbon dioxide, the solution being then pumped by means such as the pump 21 into a regenerator 22. This comprises a boiler or heater in which the solution of sodium carbonate and carbon dioxide gas is subjected to a temperature almost as high as the boiling point of water, said temperature being obtained from the exhaust gas of the power plant which operates the several pumps indicated in the diagram. This exhaust gas is preferably led into the boiler or heater through a conduit 23, through tube 25, and exhausted through a stack 24, the sodium carbonate solution surrounding said tubes.

In this regenerator, the carbon dioxide gas is boiled off, and the sodium carbonate is returned to the absorber 18, being cooled, meanwhile, by passage through a water cooler 26.

It is obvious that the exemplary embodiment of the invention, constituted by the diagrammatic showing in the drawing, furnishes merely a sufficient structural framework for the support of claims to the method and the broad concept of the apparatus constituting my invention, and that in the practical carrying out of the invention, numerous departures from the details of construction and arrangement as here shown may be resorted to without transcending the scope of the invention as claimed.

What I claim is:

Method for solidifying carbon dioxide comprising causing the carbon dioxide to traverse a cycle in which it is successively liquefied by compression, cooled in stages by different mediums to successively lower temperature levels, at least one of which stages includes heat interchange from the compressed liquid through the walls of the evaporator of a Carnot cycle refrigeration system, and permitted to expand in a chamber, collecting the snow formed by part of the carbon dioxide in the expansion stage, returning the unsolidified portion of the expanded carbon dioxide super-cooled by the expansion to the compressor, and introducing make-up carbon dioxide gas to the induction side of the compressor, said make-up gas being precooled out of contact with the cooling medium prior to its introduction to the compressor.

FORD L. PRESCOTT.